(12) United States Patent
Nickerson et al.

(10) Patent No.: US 8,332,232 B2
(45) Date of Patent: Dec. 11, 2012

(54) SYSTEM AND METHOD FOR MOBILE INTERACTION

(75) Inventors: Rand B. Nickerson, Highland Park, IL (US); Mark A. Treschl, Highland Park, IL (US); Sean E. Wolfe, Chicago, IL (US)

(73) Assignee: OpinionLab, Inc., Highland Park, IL (US)

( * ) Notice: Subject to any disclaimer, the term of this patent is extended or adjusted under 35 U.S.C. 154(b) by 305 days.

(21) Appl. No.: 12/613,199

(22) Filed: Nov. 5, 2009

(65) Prior Publication Data

US 2011/0106721 A1    May 5, 2011

(51) Int. Cl.
*G06Q 10/00* (2012.01)
(52) U.S. Cl. ......................................................... 705/1.1
(58) Field of Classification Search .................... None
See application file for complete search history.

(56) References Cited

U.S. PATENT DOCUMENTS

| | | |
|---|---|---|
| 5,537,618 A | 7/1996 | Boulton et al. |
| 5,568,489 A | 10/1996 | Yien et al. |
| 5,678,041 A | 10/1997 | Baker et al. |
| 5,706,507 A | 1/1998 | Schloss |
| 5,727,950 A | 3/1998 | Cook |
| 5,754,939 A | 5/1998 | Herz et al. |
| 5,761,683 A | 6/1998 | Logan et al. |
| 5,778,182 A | 7/1998 | Cathey et al. |
| 5,804,803 A | 9/1998 | Cragun et al. |
| 5,809,247 A | 9/1998 | Richardson et al. |
| 5,862,223 A | 1/1999 | Walker et al. |
| 5,862,260 A | 1/1999 | Rhoads |
| 5,862,325 A | 1/1999 | Reed et al. |
| 5,870,744 A | 2/1999 | Sprague |
| 5,872,850 A | 2/1999 | Klein et al. |
| 5,958,008 A | 9/1999 | Pogrebisky et al. |
| 5,973,683 A | 10/1999 | Cragun et al. |
| 5,974,572 A | 10/1999 | Weinberg et al. |
| 5,991,735 A | 11/1999 | Gerace |

(Continued)

FOREIGN PATENT DOCUMENTS

CA    2 490 828    2/2004

(Continued)

OTHER PUBLICATIONS

Vora, P.R., "Designing for the Web: A Survey," design/methods & tools, interjections, pp. 13-30, May-Jun. 1998.

(Continued)

*Primary Examiner* — Jonathan Ouellette
(74) *Attorney, Agent, or Firm* — Baker Botts L.L.P.

(57) ABSTRACT

According to one embodiment, a method for collecting feedback from a mobile device user using a mobile interaction application executed on one or more processors of a mobile device includes receiving a selection of a target of the feedback from the mobile device user; presenting a graphical user interface on a display of the mobile device, the graphical user interface including a multi-level rating scale and an open-ended comment element; receiving feedback associated with the selected target from the mobile device user through an input device of the mobile device, the received feedback corresponding to at least one of the multi-level rating scale and the open-ended comment element; and wirelessly transmitting a message including the received feedback associated with the selected target and corresponding to at least one of the multi-level rating scale and the open-ended comment element.

25 Claims, 9 Drawing Sheets

U.S. PATENT DOCUMENTS

| | | | |
|---|---|---|---|
| 6,029,171 | A | 2/2000 | Smiga et al. |
| 6,035,330 | A | 3/2000 | Astiz et al. |
| 6,134,531 | A | 10/2000 | Trewitt et al. |
| 6,141,010 | A | 10/2000 | Hoyle |
| 6,161,112 | A | 12/2000 | Cragun et al. |
| 6,189,029 | B1 | 2/2001 | Fuerst |
| 6,236,975 | B1 | 5/2001 | Boe et al. |
| 6,243,722 | B1 | 6/2001 | Day et al. |
| 6,260,064 | B1 | 7/2001 | Kurzrok |
| 6,297,819 | B1 | 10/2001 | Furst |
| 6,385,590 | B1 | 5/2002 | Levine |
| 6,389,538 | B1 | 5/2002 | Gruse et al. |
| 6,393,479 | B1 | 5/2002 | Glommen et al. |
| 6,421,724 | B1 | 7/2002 | Nickerson et al. |
| 6,434,556 | B1 | 8/2002 | Levin et al. |
| 6,449,632 | B1 | 9/2002 | David et al. |
| 6,460,036 | B1 | 10/2002 | Herz |
| 6,477,504 | B1 | 11/2002 | Hamlin et al. |
| 6,480,852 | B1 | 11/2002 | Himmel et al. |
| 6,510,427 | B1 | 1/2003 | Bossemeyer, Jr. et al. |
| 6,578,014 | B1 | 6/2003 | Murcko, Jr. |
| 6,606,581 | B1 | 8/2003 | Nickerson et al. |
| 6,606,657 | B1 | 8/2003 | Zilberstein et al. |
| 6,606,659 | B1 | 8/2003 | Hegli et al. |
| 6,618,717 | B1 | 9/2003 | Karadimitriou et al. |
| 6,631,184 | B1 | 10/2003 | Weiner |
| 6,681,247 | B1 | 1/2004 | Payton |
| 6,748,449 | B1 | 6/2004 | Dutta |
| 6,766,481 | B2 | 7/2004 | Estep et al. |
| 6,772,139 | B1 | 8/2004 | Smith, III |
| 6,792,458 | B1 | 9/2004 | Muret et al. |
| 6,819,336 | B1 | 11/2004 | Nielsen |
| 6,859,784 | B1 | 2/2005 | van Duyne et al. |
| 6,895,437 | B1 | 5/2005 | Cowdrey et al. |
| 6,928,392 | B2 | 8/2005 | Nickerson et al. |
| 6,938,202 | B1 | 8/2005 | Matsubayashi et al. |
| 7,024,691 | B1 | 4/2006 | Herzberg et al. |
| 7,181,696 | B2 | 2/2007 | Brock |
| 7,370,285 | B1 | 5/2008 | Nickerson et al. |
| 7,478,121 | B1 | 1/2009 | Nickerson et al. |
| 2001/0047290 | A1 | 11/2001 | Petras et al. |
| 2002/0049713 | A1 | 4/2002 | Khemlani et al. |
| 2002/0065802 | A1 | 5/2002 | Uchiyama |
| 2002/0072955 | A1 | 6/2002 | Brock |
| 2002/0087526 | A1 | 7/2002 | Rao |
| 2002/0087679 | A1 | 7/2002 | Pulley et al. |
| 2002/0087969 | A1 | 7/2002 | Brunheroto et al. |
| 2002/0099617 | A1 | 7/2002 | Fogelson |
| 2002/0111865 | A1 | 8/2002 | Middleton, III et al. |
| 2002/0120727 | A1 | 8/2002 | Curley et al. |
| 2003/0009555 | A1 | 1/2003 | Nickerson et al. |
| 2003/0085927 | A1 | 5/2003 | Muller |
| 2003/0115023 | A1 | 6/2003 | Nickerson et al. |
| 2003/0207238 | A1 | 11/2003 | Latzina et al. |
| 2003/0217034 | A1 | 11/2003 | Shutt et al. |
| 2004/0015866 | A1 | 1/2004 | Estep et al. |
| 2004/0049571 | A1 | 3/2004 | Johnson et al. |
| 2004/0201633 | A1 | 10/2004 | Barsness et al. |
| 2004/0205065 | A1 | 10/2004 | Petras et al. |
| 2005/0108020 | A1 | 5/2005 | Lehavi |
| 2005/0192854 | A1 | 9/2005 | Ebert et al. |
| 2005/0240618 | A1 | 10/2005 | Nickerson et al. |
| 2005/0251399 | A1 | 11/2005 | Agarwal et al. |
| 2006/0248188 | A1 | 11/2006 | Nickerson et al. |
| 2006/0259767 | A1 | 11/2006 | Mansz et al. |
| 2006/0265368 | A1 | 11/2006 | Nickerson et al. |
| 2007/0127693 | A1* | 6/2007 | D'Ambrosio et al. ... 379/265.06 |
| 2008/0033790 | A1 | 2/2008 | Nickerson et al. |
| 2008/0059286 | A1 | 3/2008 | Nickerson et al. |
| 2008/0209361 | A1 | 8/2008 | Nickerson et al. |
| 2009/0112683 | A1* | 4/2009 | Hamilton et al. ............... 705/10 |
| 2009/0235236 | A1 | 9/2009 | Nickerson et al. |
| 2010/0036687 | A1 | 2/2010 | Bansal |
| 2011/0055005 | A1* | 3/2011 | Lang ......................... 705/14.45 |

FOREIGN PATENT DOCUMENTS

| | | |
|---|---|---|
| WO | WO 99/59096 | 11/1999 |
| WO | WO 00/62204 | 10/2000 |
| WO | WO 01/16841 | 3/2001 |
| WO | WO 2004/012044 | 2/2004 |

OTHER PUBLICATIONS

"Dna," DIARIST.NET, http://www.diarist.net/active /showthread. php?t=345>, XP002382097, 2 pages, May 8, 2001, Retrieved May 22, 2006.

OpinionLab, "OL™ the leader in automated web feedback solutions," white papers, www.opinionlab.com, pp. 1-70, Printed Jul. 11, 2007.

OpinionLab, "O-Metric Demonstration Tutorial," 6 pages, available prior to Jul. 31, 2001.

OpinionLab, "Best Practices in Collecting Web User Feedback," pp. 1-10, Apr. 2001.

OpinionLab, "OpinionLab's Audit of the Fifty Most Trafficked Websites," pp. 1-4, 2002.

OpinionLab, "Millions of people visit Websites every day. What do they think? It's a simple premise. If you want to know what people think, you have to ask them. (+)" white papers, 23 pages, available prior to Jul. 31, 2001.

OpinionLab, "Brochure re: User Experience Optimization," 1 page, available prior to Jul. 31, 2001.

OpinionLab, "Brochure re: Navigating an O-Metric Report," pp. 1-3, available prior to Jul. 31, 2001.

OpinionLab, "The OnlineOpinion System—Different From Other Feedback Techniques," XP002382096, [online], http://web.archive.org/web/20021010024033/www.opinionlab.com/different.asp>, 2 pages, Jul. 23, 2002, Retrieved May 22, 2006.

BizRate.com, Independent Merchant Evaluation, https://eval.bizrate.com/popchoice.pl?id=19383&rb=I&ip=204.194.97.2 &xsum=67748, 1 page; https://eval.bizrate.com/eval_t.pl?id=19383 &ip=204.194.97.2&xsum=67748&g=102, 5 pages, Printed Jun. 13, 2000.

OpinionLab, "Different Versions of the Online Opinion Data Collection Technique Dramatically Impact the Type of Response a Website Receives," White Paper, 5 pages, 2001.

Graham, J., "Alternatives to Testing User Experience," [online], Clickz.com, http://www,clickz.com/experts/brand/emkt_strat/print. php/827111, XP002382095, 2 pages, Jul. 31, 2000, Retrieved on May 22, 2006.

Shahabi, C., et al., "Knowledge Discovery from Users Web-Page Navigation," XP010219671, ISBN: 0-8186-7849-6, Research Issues in Data Engineering, 1997 Proceedings, Seventh International Workshop on Birmingham, UK Apr. 7-8, 1997, Los Alamitos, CA, USA, IEEE Computer Society US, pp. 20-29, Apr. 7, 1997.

Watt, J.H., et al., "Using the Internet for Audience and Customer Research," XP010355892, ISBN: 0-7803-579-09-4, Professional Communication Conference 1999, IPCC 99, Communication Jazz: Improvising the New International Communication Culture, Proceedings 1999, IEEE International New Orleans, LA, Piscataway, NJ, USA, IEEE US, pp. 121-130, Sep. 7-10, 1999.

Katerattanakul, P., et al., "Measuring Information Quality of Web Sites: Development of an Instrument," from the 20th International Conference on Information Systems, 7 pages, Jan. 1999.

Tullis, T.S., "A Method for Evaluating Web Page Design Concepts," from CHI 98 Conference Summary on Human Factors in Computing Systems, ACM, ISBN 1-58113-028-7, 2 pages, Apr. 1998.

Faison, T., "Component-Based Development with Visual C#," Online!, XP002333001, Chapter 8, Creating Front Ends with the WebBrowser Component, pp. 1-4, 27, 33, Feb. 2002.

Etgen, M., et al., "What Does Getting WET (Web Event-Logging Tool) Mean for Web Usability?," Proceedings of the 5th Conference on Human Factors & The Web, XP002332999, Jun. 3, 1999, Retrieved Mar. 4, 2010.

Blankenbeckler, D., "Browser Support for Active Content," Chapter 25, XP-002333000, Excerpted from: Morgan, Bryan, "*Visual J++ Unleashed*," Online!, SAMS.NET, Indianapolis, Ind., http://web.

archive.org/web/20040301061953/http://ww.intel.com /procs/ppro/intro/vrml/mma.wrz, http://docs.rinet.ru/ZhPP/ch25.htm,. 11 pages, Retrieved Jun. 21, 2005.

CTIA, "Camera-Phone Based Barcode Scanning, CTIA Code Scan Action Team," White Paper, 27 pages, Sep. 9, 2008.

GS1, "Mobile Commerce: opportunities and challenges," a GS1 Mobile Com White Paper, 57 pages, Feb. 2008 Edition.

Kindberg, T., "Mobile Codes: Standards and Guidelines A Discussion document," Publicis Groupe, Hewlett Packard Laboratories, Gavitec AG—mobile digit, and Neomedia Technologies, 5 pages, Feb. 2007.

Open Mobile Alliance, White Paper on Mobile Codes, Open Mobile Alliance, OMA-WP-MobileCodes-20081024-A, OMA-Template-WhitePaper-20080101-1, 26 pages, Approved Oct. 24, 2008.

PCT, Notification of Transmittal of International Preliminary Examination Report, PCT/US00/23875, 5 pages, Aug. 22, 2002.

PCT, Notification of Transmittal of the International Search Report or the Declaration, PCT/US 03/23857, 7 pages, Jan. 8, 2004.

PCT, Notification of Transmittal of the International Search Report or the Declaration, PCT/US03/23327, 6 pages, Sep. 7, 2004.

EP, European Search Report—Communication, Application No. EP 05252213.3-1238, 4 pages, Jun. 30, 2005.

EP, Supplemental European Search Report—Communication, Application No. 03771825.1-2205, Patent No. PCT/US0323250, Application No. EP 03771825.1-2205, 3 pages, Jun. 21, 2006.

European Patent Office, Communication for Application No. 07016965.1-1238, Nov. 7, 2007.

PCT, Notification of Transmittal of the International Search Report or the Declaration, PCT/US06/18184, 9 pages, mailed Mar. 7, 2008.

Canadian Intellectual Property Office, "Office Action," for Application No. 2,489,322, 5 pages, Nov. 14, 2008.

EP, Decision to refuse a European Patent application, Application No. 05 252 213.3 -1238, Ref. JL5137, Nov. 18, 2008.

International Search Report and Written Opinion for PCT/US10/53892, Feb. 10, 2012.

* cited by examiner

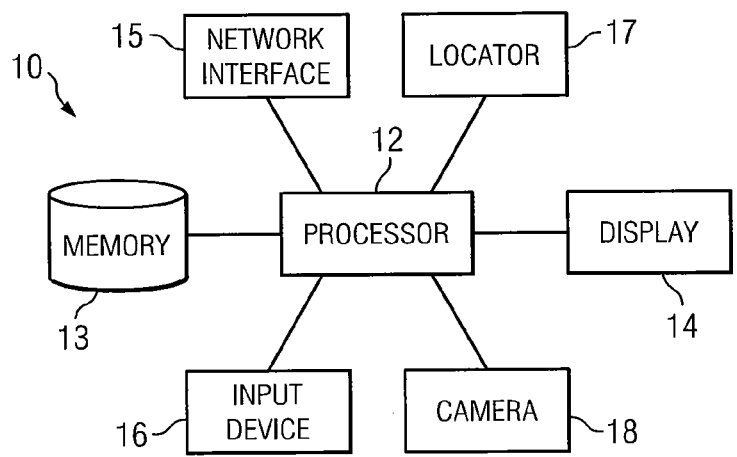
*FIG. 2*
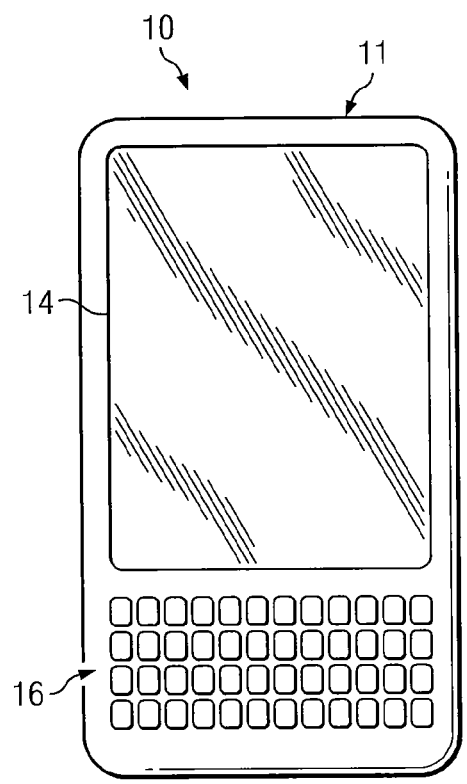 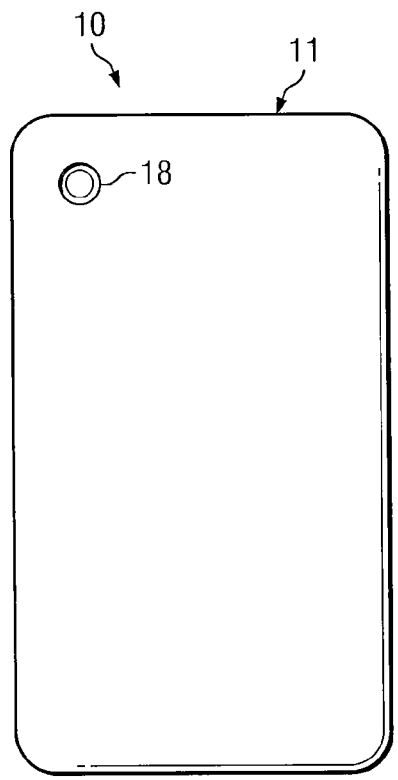
*FIG. 3A*   *FIG. 3B*

190a

Leave Your Feedback

OVERALL RATING

| -- | - | +- | + | ++ | —191

COMMENTS

Please enter your comments

192

193a — Submit

Leave Feedback

RATING

| -- | - | +- | + | ++ | —191

COMMENTS

192

EMAIL

If you would like us to contact you name@example.com 194  193b — Send Feedback

Would You Recommend This Store To A Friend? —195

| -- | - | +- | + | ++ |
191 email@domain.com —196

Comments?

Text   Talk

—197

193c — Send

*FIG. 9C*

SYSTEM AND METHOD FOR MOBILE INTERACTION

TECHNICAL FIELD

This invention relates generally to computer-implemented customer support and more particularly to a computer-implemented system and method for providing mobile interaction.

BACKGROUND

Businesses interact with their customers and potential customers in a variety of ways. These interactions may occur at different locations or touch points. For example, these interactions may occur at a physical place of business, through a website, or through various physical and electronic media and advertisements. To facilitate the communication of a common marketing theme, a business may attempt to provide continuity through consistent themes across all touch points with their customers and potential customers. A business may also solicit feedback or other forms of interaction from their customers or potential customers at various touch points. For example, a business may request feedback from customers at their place of business through the use of pre-paid postage comment cards, comment card drop boxes, or through personal inquiry while the customer is at their place of business. Some businesses may solicit feedback from customers who visit their online website through various feedback collection applications. However, utilizing the information received from customers and potential customers across various points of contact may be difficult.

OVERVIEW

Particular embodiments of the invention may reduce or eliminate problems and disadvantages associated with previous techniques for interacting with customers and potential customers or with utilizing information provided by customers or potential customers.

According to one embodiment, a method for collecting feedback from a mobile device user using a mobile interaction application executed on one or more processors of a mobile device includes receiving a selection of a target of the feedback from the mobile device user; presenting a graphical user interface on a display of the mobile device, the graphical user interface including a multi-level rating scale and an open-ended comment element; receiving feedback associated with the selected target from the mobile device user through an input device of the mobile device, the received feedback corresponding to at least one of the multi-level rating scale and the open-ended comment element; and wirelessly transmitting a message including the received feedback associated with the selected target and corresponding to at least one of the multi-level rating scale and the open-ended comment element.

According to embodiment, software for collecting feedback from a mobile device user is operable to receive a selection of a target of the feedback from the mobile device user; present a graphical user interface on a display of the mobile device, the graphical user interface comprising a multi-level rating scale and an open-ended comment element; receive feedback associated with the selected target from the mobile device user through an input device of the mobile device, the received feedback corresponding to at least one of the multi-level rating scale and the open-ended comment element; and wirelessly transmit a message including the received feedback associated with the selected target and corresponding to at least one of the multi-level rating scale and the open-ended comment element.

According to one embodiment, a mobile apparatus for use in collecting feedback for a selected target includes a wireless transceiver, a digital display, a digital camera, one or more processors, and memory. The one or more processors are coupled to the transceiver, the digital display, the digital camera, and the memory. The memory stores program instructions configured to receive data from the digital camera, the data corresponding to a barcode image collected by digital camera; to transmit an outgoing message using the wireless transceiver, the outgoing message containing at data corresponding to at least a portion of the barcode image; to receive an incoming message using the wireless transceiver, the incoming message containing parameters for one or more feedback solicitation elements based on the data contained in the outgoing message; and to present the one or more feedback solicitation elements on the digital display using the parameters received in the incoming message.

According to one embodiment, a computer-implemented method for providing mobile interaction includes accessing information associated with a user experience for a particular mobile user and associated with a target entity, the accessed information including user feedback collected from the particular mobile user using mobile interaction software on a mobile device, the target entity having been selected based either on association with a location of the mobile device or on association with a graphical image collected by a camera on the mobile device; accessing intervention trigger logic; identifying at least one intervention trigger by applying the intervention trigger logic to at least a portion of the accessed information associated with the user experience; and generating one or more intervention elements for presentation to the particular mobile user, in response to the identification of at least one intervention trigger. Although certain embodiments are described above, numerous other embodiments are contemplated as described further below.

Certain embodiments may provide a number of technical advantages related to interacting with customers or potential customers across one or more of a wide variety of touch points. Certain embodiments may provide support for anonymous comments or feedback from customers or potential customers. Certain embodiments may provide a more convenient mechanism for providing comments or feedback. Certain embodiments may allow for real-time or substantially real-time analysis of information provided by customers or potential customers. Certain embodiments may provide the ability to provide support to customers or potential customers and such support may be provided in real-time or substantially real-time in certain situations. Certain embodiments may provide faster or more accurate utilization of information provided by customers or potential customers. Certain embodiments may help businesses or business managers recognize when a mobile user is having a poor experience and take appropriate action to mitigate the problem to improve their experience. Certain embodiments allow for automated intervention when a mobile user is having a poor experience. Certain embodiments may improve user retention by addressing user needs in real-time. Certain embodiments allow improved methods of advertising and cross selling to customers or potential customers. Certain embodiments may provide all, some, or none of the advantages described. Certain embodiments may provide one or more other technical advantages, one or more of which may be readily apparent to those of skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which:

FIG. 2 illustrates a block diagram of an example mobile device for use in providing mobile interaction;

FIGS. 3A-3B illustrate front and back views of an example mobile device;

FIGS. 9A-9C illustrate example graphical user interfaces for a mobile interaction application;

DETAILED DESCRIPTION

Figure 1:
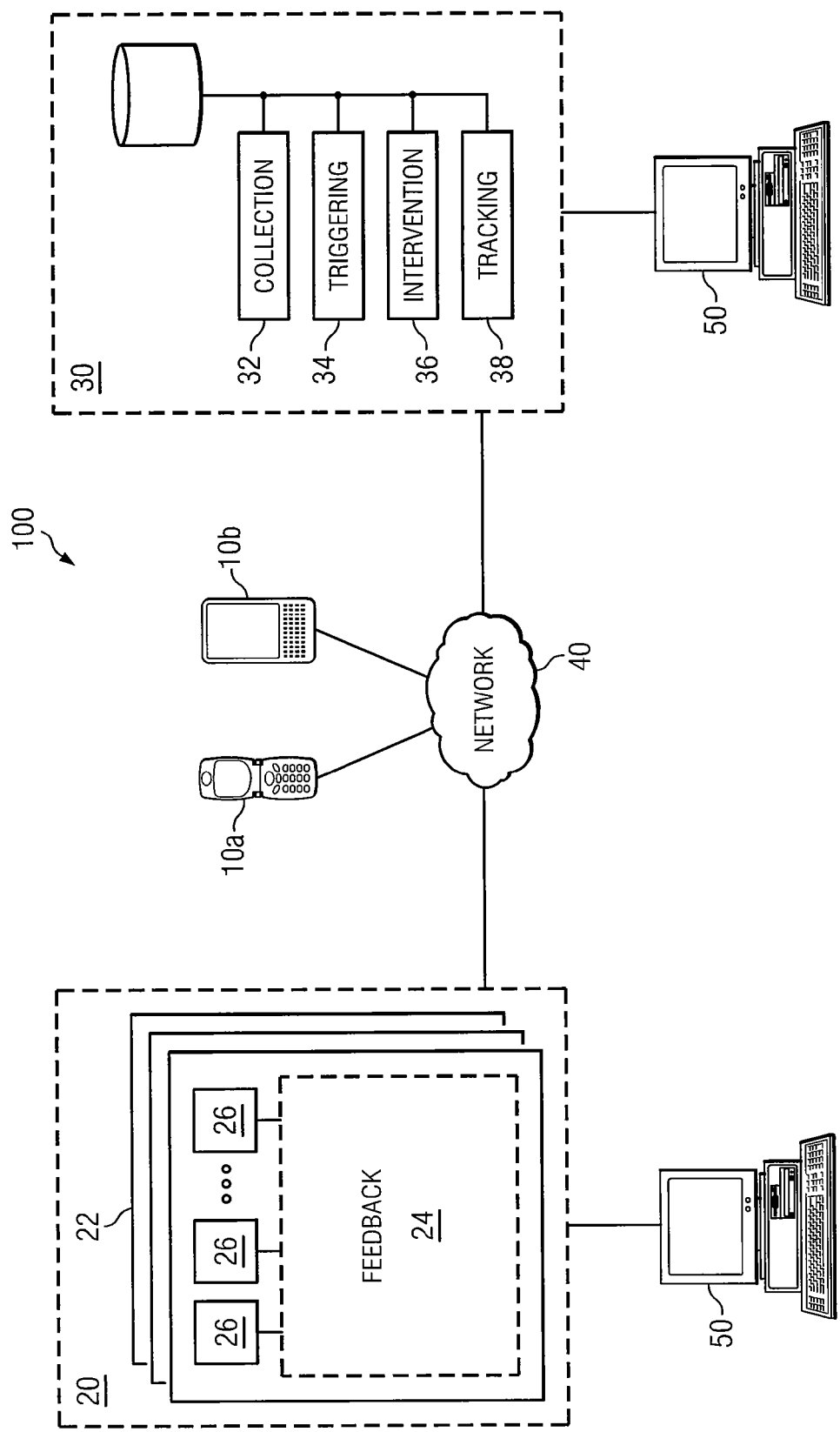
FIG. 1 illustrates an example system for use in providing mobile interaction.

Businesses interact with their customers and potential customers in a variety of ways. These interactions may occur at different locations or touch points. For example, these interactions may occur at a physical place of business, through a website, or through various physical and electronic media and advertisements. To facilitate the communication of a common marketing theme, a business may attempt to provide continuity through consistent themes across all touch points with their customers and potential customers. A business may also solicit feedback or other forms of interaction from their customers or potential customers at various touch points. For example, a business may request feedback from customers at their place of business through the use of pre-paid postage comment cards, comment card drop boxes, or through personal inquiry while the customer is at their place of business. Some businesses may solicit feedback from customers who visit their online website through various feedback collection applications. Example feedback collection applications are described, for example, in U.S. Pat. Nos. 6,421,724; 6,606,581; and 6,928,392, each of which is incorporated herein by reference. However, utilizing the information received from customers and potential customers across various points of contact may be difficult. Specifically, it may be difficult or time consuming to analyze and respond to handwritten feedback on printed comment cards. Similarly, it may be difficult or time consuming to combine information received from various touch points into a common resource for analysis.

According to certain embodiments of the invention, a common system may be used to receive and analyze information provided by customers and potential customers at a variety of touch points. For example, an application that collects feedback from website users may populate a database that is also used by an application that receives feedback submitted by mobile device users. By combining the information from various sources, more meaningful analysis may be performed.

According to a particular embodiment of the invention, an application may be loaded on a mobile device to facilitate interaction with mobile users. In certain embodiments, the interaction may be directed at a particular business, store, service, and/or advertisement. In certain embodiments, the user may select the particular target for the mobile interaction based on their current location, by selecting a company or a store using a search algorithm, or by using a mobile device to select the target based on an image. For example, a mobile user may scan or photograph a graphic image, or tag, to identify a particular business, product, advertisement, store, etc. In certain embodiments, the image or tag may include a 1D barcode, a 2D barcode, and/or a color barcode. Example bar code standards may include, but are not limited to, QR, DataMatrix, EAN-8, EAN-13, UPC-A, and UPC-E. In a certain embodiments, the image or tag may include a plus sign enclosed by brackets [+]. In a particular embodiment the plus sign enclosed by brackets [+] may be substantially at the center of the image for recognition. The mobile user may then utilize the application to provide information related to the particular business, product, advertisement, store, etc., including, for example, an opinion, comment, rating, question, and/or suggestion.

Feedback and other forms of information from the mobile user and/or mobile device may be provided and/or collected by various means. For example, feedback may be provided and collected in the form of written or typed comments, verbal comments, physical movements, or by various other means. In certain embodiments, feedback may be provided and collected in the form of comments from a user. For example, in certain embodiments the user may provide feedback by responding to questions or prompts provided electronically. In certain embodiments, a user comment may be provided by selecting a choice from a list, or by checking or marking a visual element. Certain embodiments allow a user to provide feedback by providing written comments, verbal comments, or otherwise communicating a statement. In certain embodiments, feedback may be received and/or collected by receiving user selections, such as selection of elements in a list, diagram, chart, graph, or figure displayed on a graphical user interface. Certain embodiments provide for feedback provision and/or collection according to various other methods.

In certain embodiments, user feedback may be categorized by the user that provides the feedback through the use of one or more tools available at the time the feedback is provided. For example, while a user is using a mobile application or web page feedback application, the user may identify a category for a particular user comment. As an alternative, all or a portion of the user comments may be automatically categorized by one or more software applications executed on a computer system, in response to the user comments being accessed. For example, a software application executed on a computer system may utilize keyword associations to categorize user comments. In addition, or as an alternative, a software application executed on a computer system may utilize inductive learning algorithms, including Bayesian filters, or other appropriate logic to categorize user comments. In certain embodiments, a software application executed on a computer may utilize natural language interpretation techniques.

In certain embodiments, user comments may be categorized at least in part based on the user's demographic information, contextual information, or other information relating to the user or the user's methods of providing feedback. For example, a mobile user's comments may be categorized based on the user's location (including a particular location within a store), a user's phone brand or model, a user's network access provider (mobile phone company), a user's purchase history, a user's feedback history, etc. As another example, web page user comments may be categorized based on the user's IP address, hostname, username, password, network connection, time zone, operating system, web browser, screen resolution, plug-ins, referring page, and/or browser history. In certain embodiments, this categorization based on demographic information or contextual information may be used as an alternative to, or in addition to, categorization based on the user's comments or other feedback.

In certain embodiments, user comments may be tracked or categorized based on information provided by or associated with the user. For example, a user may perform an initial set-up and provide their name, address, email, phone number, demographic information (such as age, gender, income, marital status, ethnicity, etc.), lifestyle information, or preferences (such as sports, entertainment, fashion, political, or consumer purchase preferences). The user may then be provided with a user identifier that they can provide in the future to associate future activities with some or all of the information provided. In certain embodiment, this identifier may be provided automatically if the user interacts using the same device. In an alternative embodiment, a user may provide or select certain information each time the user provides comments or other interactions. In certain embodiments, a user may provide information one time and then have an option to pre-populate selected information during future uses with the same device or by providing an identifier.

At the time that feedback is provided by a user through the use of a feedback mechanism, such feedback may provide a strong indication of whether the user is having a positive, neutral, or negative experience. By processing this feedback in real-time, alone or in combination with other information, actions can be taken to improve or enhance that particular user's experience at or near that particular point in time. In situations where the particular user is having a negative experience, such real-time intervention may be necessary to retain the user. In some situations, the few seconds after a user submits feedback may be the only opportunity to improve the user's experience before they leave the location, never to return. Accordingly, the ability to take action in this few seconds may be critical to retain a user, such as a web customer or mobile user. Although not required, in certain embodiments, in order to take action to intervene with a particular user's experience, characteristics of the user's experience must be determined, triggering or threshold requirements must be met, and appropriate interventions must be identified and delivered to the particular user quickly. In some instances, such intervention must be delivered before the user leaves a particular location.

Various embodiments may use a variety of triggers or threshold criteria to determine when an intervention should be initiated. For example, an intervention may be initiated automatically upon receipt of negative feedback. In a particular embodiment, an intervention may be triggered in response to an analysis of the words and phrases used in an open-ended comment provided in feedback by the user. In various embodiments, this analysis may be performed through the use of Boolean queries, through the application of Bayesian filters, or through the use of alternative automated inductive learning algorithms or other forms of artificial intelligence.

For example, based on an analysis of a plurality of user generated comments associated with corresponding multi-level ratings, a series of filters may be developed to identify particular words and phrases that, in combination, indicate a positive or negative user experience. These types of filters may be expanded to further consider additional information such as user demographics and contextual data. In certain embodiments, natural language interpretation techniques may be used to analyze particular blocks of text to evaluate the content. In certain embodiments, the threshold or trigger criteria may vary over time or from one user to the next according to specified criteria. For example, the threshold level may increase or decrease to some extent based on randomization logic such that the intervention experience is not identical from one user to the next. Through the use of such variation, additional information may be determined regarding the appropriate trigger levels and/or the appropriate interventions to achieve optimal results.

In certain embodiments, once a triggering threshold has been met and a determination has been made to initiate an intervention, the appropriate intervention may be identified and presented to the particular user. Although in certain embodiments, a single intervention may apply to all users who satisfy the specified triggering threshold, in alternative embodiments, a variety of interventions may be available. In a particular embodiment, comment feedback key-word associations may be used alone or in combination with contextual data to specify a particular intervention. Such intelligent support may enhance the particular user's experience, which may result in continued or increased utilization by the user.

In a particular embodiment, an intervention may be in the form of a trouble ticket form that can be pre-populated with information collected regarding the particular user's experience. For example, in response to determining that a particular user has reported a problem related to a particular product in an open-ended comment box in a feedback form, a trouble ticket form may be generated that identifies the the text of the problem reported, the type of product discussed, and/or any other relevant information collected. Such a trouble ticket may be available for the particular user to review and send without having to re-type any of the information previously provided or to type information pre-populated in the trouble ticket form. Such intelligent support may encourage the user to submit the trouble ticket, allowing for a proper response and the possibility of continued use of the product by the user. In certain embodiments, such intelligent support may prevent the provision of the feedback by the user from being the last interaction that the user has with a product or associated entity. In another particular embodiment, an intervention may be in the form of a link to a website.

FIG. 1 illustrates an example system 100 for providing mobile interaction. System 100 includes one or more mobile devices 10, content server 20, and support server 30, coupled to one another using network 40. Mobile device 10 may be a portable wireless network device capable of sending and receiving communications signals. In particular embodiments, mobile device 10 may be a wireless handset such as a mobile phone 10a or PDA 10b. Although example mobile devices 10 are identified herein, any appropriate mobile device may be used to interact with one or more other components of system 100. Content server 20 and support server 30 may be autonomous computer systems or they may receive appropriate input from one or more associated persons. Content server 20 and support server 30 may include software operating on one or more computer systems 50. In certain embodiments, content server 20 and support server 30 may operate on at least one shared computer system. In certain embodiments, content server 20 and support server 30 may be locally or remotely distributed across multiple computer systems. In certain embodiments, content server 20 and support server 30 may be co-located on a single device. In certain embodiments, mobile device 10, content server 20, and/or support server 30 may include input devices, output devices, processors, memories, and other components suitable for the features and operation described below.

Content server 20 may generate feedback solicitations 24 comprising one or more feedback elements 26. In certain embodiments, feedback elements may be stored on content server 20 and transmitted to mobile device 10 for use in displaying feedback solicitation on mobile device 10. In certain embodiments, feedback solicitation may be displayed in the form of one or more graphical user interfaces, examples of which are described below in relation to FIGS. 9A-9C. In certain embodiments, content server transmits elements that identify content already contained by mobile device 10, such that the elements may be used by the mobile device to format content for display to a user.

Support server 30 includes collection module 32, triggering module 34, intervention module 36, tracking module 38, and database 39. Although each module is described separately, two or more of these modules may be combined and/or certain modules may be formed from one or more additional modules. Collection module 32 includes logic to collect information from a particular user. This information may include current and/or historical feedback, current and/or historical web traffic history, contextual information, purchasing history, and/or demographic information. Triggering module 34 includes logic to analyze one or more portions of the information collected by collection module 32 to determine whether a particular intervention is needed at a particular time for a particular user. Intervention module 36 includes logic to identify and generate one or more interventions to improve a user's experience. Tracking module 38 includes logic to collect, store, and monitor a user's utilization of particular interventions. In certain embodiments, tracking module 38 may further include logic to correlate intervention utilization with overall user retention information. Further description of the logic and associated functions associated with collection module 32, triggering module 34, intervention module 36, and tracking module 38 is provided below. In certain embodiments, database 39 stores information collected and used by collection module 32, triggering module 34, intervention module 36, and tracking module 38. Although database 39 is described herein as a single database, in certain embodiments, the information stored in database 39 may be distributed across multiple databases housed in one or multiple local or remotely distributed systems.

Components of system 100 may be coupled using network 40. Network 40 may be a wireless network, including but not limited to network satisfying one or more of the IEEE 802.11 standards; network 40 may be an analog or digital cellular network; and/or network 40 may be any suitable combination of the two. In certain embodiments, portions of network 40 may include or be coupled to a local area network (LAN), metropolitan area network (MAN), wide area network (WAN), global communications network (such as the Internet), or any other suitable wireless or wireline network. Although mobile devices 10, content server 12, and support server 14 are described as coupled using a single network 40, the present invention contemplates multiple networks 40 of the same type or different types to couple these components to one another, according to particular needs.

Although system 100 is described herein as an example system for mobile interaction, any appropriate system may be used to accomplish the functions disclosed herein without departing from the scope of certain embodiments of the present invention. For example, various components of system 100 may be combined.

FIG. 2 is a block diagram of an example mobile device 10. In the embodiment shown, mobile device 10 includes processor 12, memory 13, display 14, network interface 15, input device 16, locator 17, and camera 18. In alternative embodiments, mobile device 10 may include more or fewer components. The components of mobile device 10 may be coupled to, enclosed within, or integrated with a housing 11. FIGS. 3A and 3B illustrate front and back views respectively of an example mobile device 10 for use with system 100. In the embodiment shown, mobile device 10 includes housing 11, display 14, input device 16, and camera 18.

Processor 12 represents one or more modules configured to control the operation of mobile device 10 and/or to execute one or more software modules stored in memory 13 and/or received through network interface 15. For example, processor 12 may be a programmable logic device, a microcontroller, a microprocessor, any suitable processing device, or any combination of the preceding. Memory 13 may represent one or more volatile or non-volatile memory modules. For example, memory 13 may include, but is not limited to, one or more flash memory modules. In addition, memory 13 may include one or more removable memory modules. In certain embodiments, memory module may store all or a portion of a mobile interaction application that may be executed by processor 12.

Display 14 provides a visual interface for mobile device 10. In certain embodiments, display 14 may be used to display text, graphical images, and/or video to a user of mobile device 10. In a particular embodiment, display 14 may represent an LCD screen. Network interface 15 includes components configured to communicate information and signals to and receive information and signals from one or more components of network 40. In particular embodiments, network interface may include one or more antennas and accompanying hardware and controlling logic to communicate with a wireless network using one or a combination of multiple wireless standards, including but not limited to appropriate TDMA, CDMA, GSM, IEEE 802.11, and 3GPP standards.

Input device 16 includes components to receive input from a user of mobile device 10. For example, input device 16 may include one or more of a keypad, keyboard, selection buttons (on any surface or side of housing 11), a directional pad, trackball, or any other suitable components to receive input from a user of mobile device 10. In certain embodiments the functionality of input device 15 may be combined with display 14 as a touchscreen to enable a user to provide input to mobile device 10 by touching or otherwise manipulating a visual display. In certain embodiments, input device 16 may include one or more components to detect and interpret movement or orientation of all or a portion of mobile device 10. In certain embodiments, input device 16 may include a microphone and/or other suitable components to receive audible input from a user of mobile device 10.

Locator 17 includes components configured to determine a location of mobile device 10. In certain embodiments, location may be determined in latitude and longitude coordinates. In alternative embodiments, location may be determined relative to or by proximity to one or more fixed locations, such as by proximity to one or more antennas. In certain embodiments, locator 17 may determine the location of mobile device 10 through the use of GPS, AGPS, LORAN, cell-tower or WiFi antenna triangulation, cell-tower or WiFi antenna proximity or signal strength, and/or other appropriate techniques. In certain embodiments, locator 17 may use multiple techniques to determine the location of mobile device 10 at a given time or may use different techniques depending on the availability or reliability of the different techniques at different times or locations. In a particular embodiment, locator 17 includes a GPS chipset. Locator 17 may also include an antenna that may be the same or different from an antenna used to communicate with a wireless network. In certain embodiments, in addition to or as an alternative to the location of mobile device 10 being determined by locator 17, the location of mobile device 10 may be determined by an external system, such as by one or more components of a cellular or wireless network. In certain embodiments, components of locator 17 may be common to or share components of processor 12. For example, all or a portion of the location determinations may be performed by processor 12. Camera 18 includes any suitable hardware and/or software to facilitate capturing images. For example, camera 18 may include lenses, light sensors, controllers, and image capture and processing logic.

In operation, a user may initiate or launch a mobile interaction application on mobile device 10. In certain embodiments, a user may select a particular target for the mobile interaction based on current location, by selecting a company, store, etc. using a search algorithm or web browser, or by using camera 18 to select the target based on an image or tag.

Figure 4:
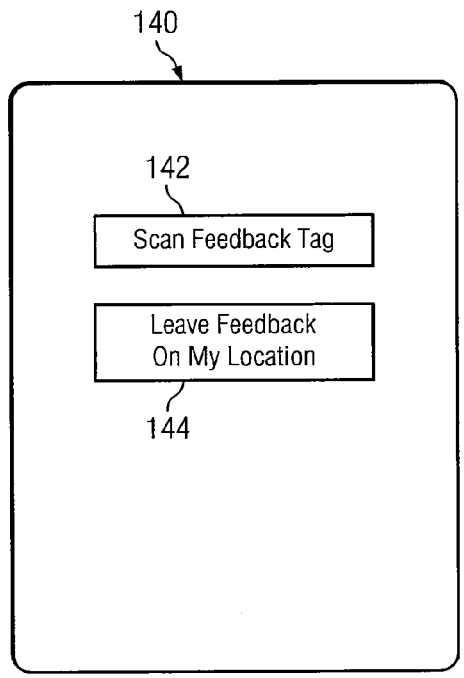
FIG. 4 illustrates an example graphical user interface to provide alternative selection methods for a target of mobile interaction.

FIG. 4 illustrates an example graphical user interface 140 that may be presented to on mobile device 10 to provide alternative selection methods for a target of mobile interaction. In the embodiment shown, graphical user interface 140 presents two alternatives. The first alternative is to select the target by scanning or otherwise collecting an image or tag. In this embodiment, this first option may be elected by selecting graphical selection element 142. The second alternative is to select the target based on the location of mobile device 10. In this embodiment, this second option may be elected by selecting graphical selection element 144. Although graphical user interface 140 identifies two alternative selection methods, in other embodiments other selection methods could be presented. Other selection methods may include one or more of an option to select the target based on a string or keyword search, an option to select the target based on an address, an option to select the target by identifying a website affiliated with the target, an option to select the target from a map, and/or an option to select from most popular, recent, or a pre-defined list of targets. In a particular embodiment, a pre-defined list of targets may be generic across all users or may be customized for a particular user or group of users.

In a particular embodiment, a group may or entity may identify a particular product or service and solicit feedback from the members of the particular group or affiliated with or identified by the entity. For examples, members of a particular club or organization may be solicited by that club or organization to provide feedback for a particular product or service. In certain embodiments, demographic or other user information may be used to identify a target group for a survey or to provide feedback for a particular product, service, idea, or other survey topic. For example, a particular solicitation may be distributed only to users within a certain age and gender category, or only to users at a specified income level. In certain embodiments, members of a group may elect to receive such solicitations and may chose whether or not to participate in such surveys.

In response to the mobile interaction application receiving an election to select a mobile interaction target by scanning or otherwise collecting an image or tag, the application may activate an image collection software module, which may activate camera 18. An image or tag from a mobile interaction solicitation may then be collected using camera 18 on mobile device 10.

Figure 5A:
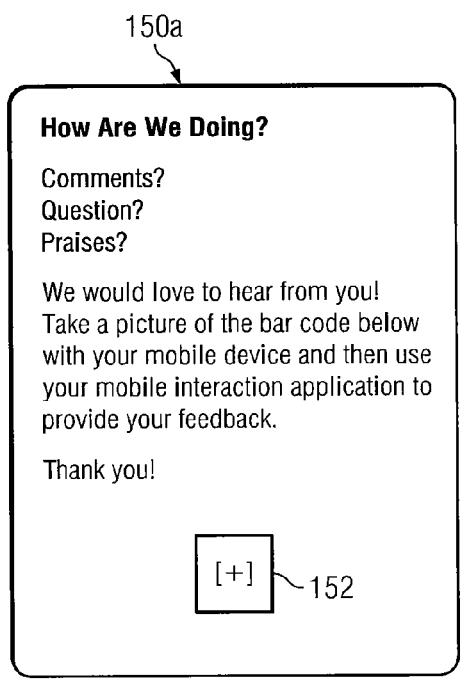
FIGS. 5A-5D illustrate example mobile interaction solicitations.
Figure 5B:
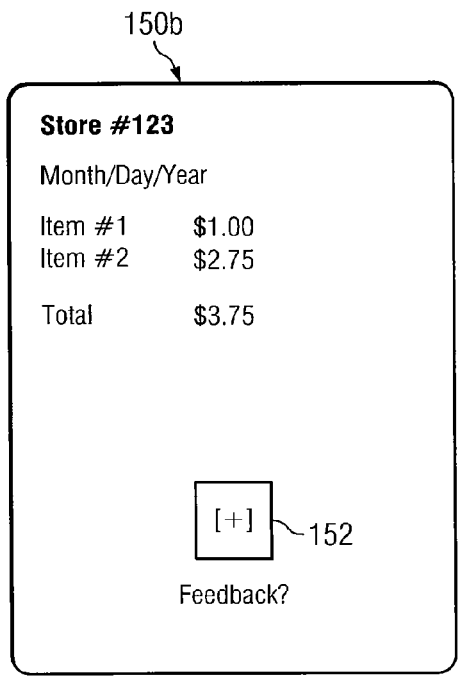
Figure 5C:
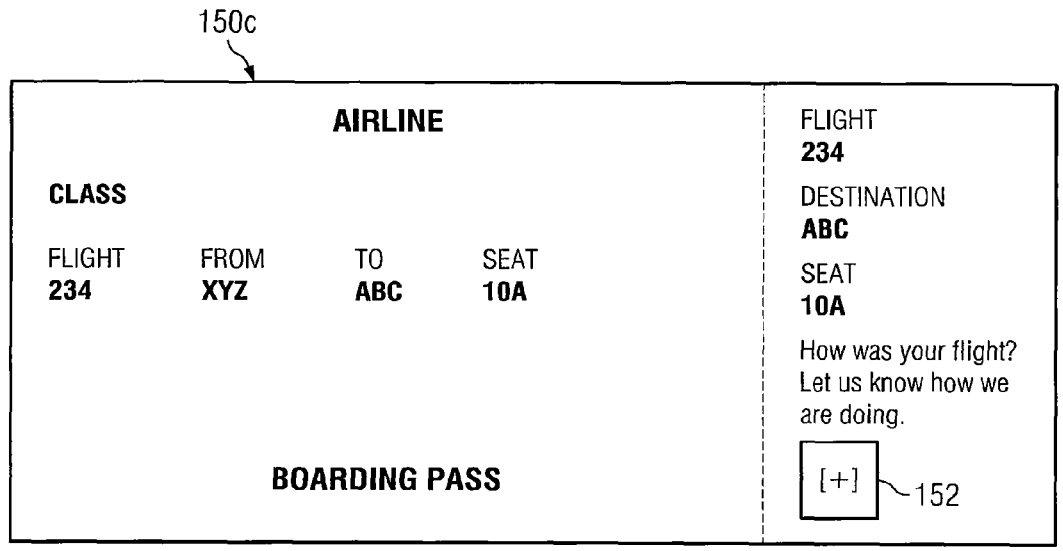
Figure 5D:
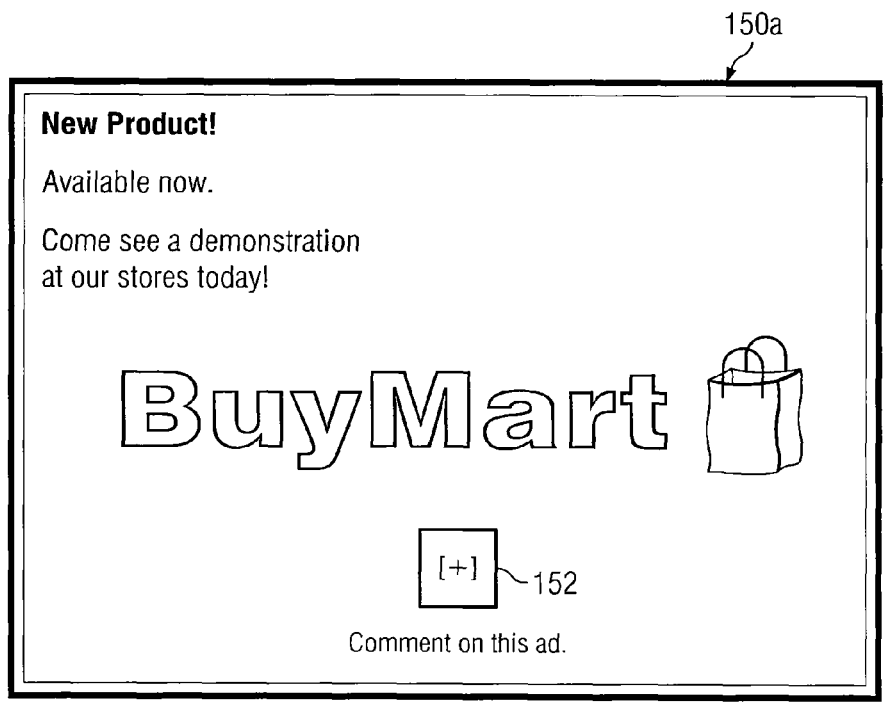

FIGS. 5A-5C illustrate example mobile interaction solicitations 150. FIG. 5A illustrates an example solicitation 150a that may be used at a point of sale; FIG. 5B illustrates an example solicitation 150b that may be used with a purchase receipt; FIG. 5C illustrates an example solicitation 150c that may be used with a passenger document, such as an airline boarding pass; and FIG. 5D illustrates an example solicitation 150d that may be used with an advertisement, such as a printed advertisement in a magazine or newspaper. Each solicitation includes a graphical element 150 that may be scanned or photographed by camera 18 to initiate mobile interaction or to identify a target of mobile interaction. In certain embodiments, graphical element 150 may include a 1D barcode, a 2D barcode, and/or a color barcode. In certain embodiments, graphical element 150 may comply with one or more barcode standards, such as QR, DataMatrix, EAN-8, EAN-13, UPC-A, and UPC-E. In a certain embodiments, graphical element 150 may include a plus sign enclosed by brackets [+]. In a particular embodiment the plus sign enclosed by brackets [+] may be substantially at the center of graphical element 150 for recognition by a user and/or mobile interaction application. In certain embodiments, a mobile interaction application may be launched automatically in response to a user scanning or collecting an image of a mobile interaction solicitation with camera 18.

Figure 6:
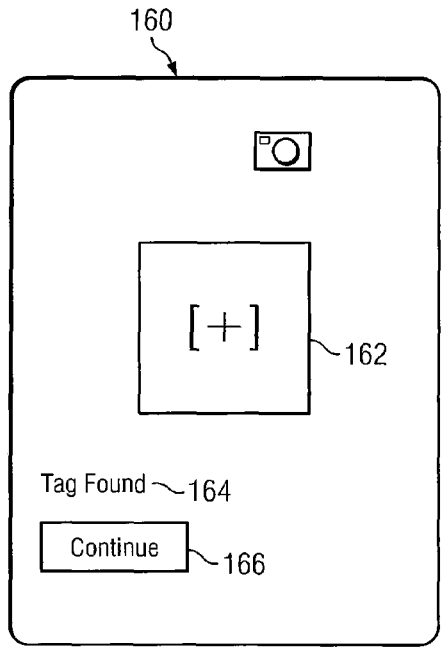
FIG. 6 illustrates an example graphical user interface to facilitate scanning or otherwise collecting an image or tag.

FIG. 6 illustrates an example graphical user interface 160 that may be presented to a user on display 14 to facilitate scanning or otherwise collecting an image or tag. In the embodiment shown, graphical user interface 160 displays image 162 of graphical element 150 scanned or collected by camera 18. In response to a determination by the mobile interaction application that image 162 is recognized or associated with a known target, graphical user interface 160 may include a message 164 indicating that the image or tag has been found. In certain embodiments, graphical user interface 160 may include a selection element 166 that the user may select to proceed. In certain embodiments, an image or tag may be associated with a particular company and graphical user interface 160 may display a list of stores owned by that company from which the user may select. In certain embodiments, the image or tag may be associated with a particular store and graphical user interface 160 may display a list of services available at the particular store for selection by the user.

Figure 7:
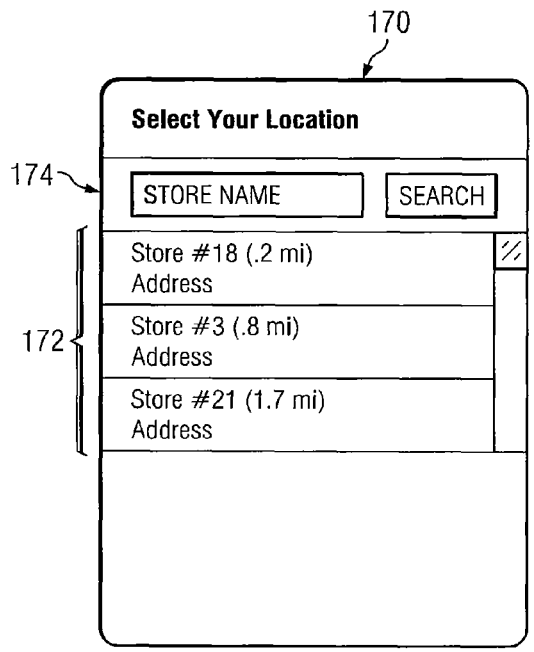
FIG. 7 illustrates a graphical user interface to facilitate selection of a target based on the location of a mobile device.

FIG. 7 illustrates a graphical user interface 170 to facilitate selection of a target based on the location of mobile device 10. In certain embodiments, mobile interaction application may utilize locator 17 to determine the location of mobile device 10. For example, in embodiments where locator 17 represents a GPS chipset, mobile interaction application may utilize the GPS chipset to determine the current latitude and longitude of mobile device 10. Based on this determination, mobile application or a remote application may determine one or more targets associated or in proximity to the determined location. The application may then generate graphical user interface 170, including target list 172 with one or more potential targets associated with or in proximity to the location of mobile device 10.

Alternatively, a user may type or otherwise indicate the name or type of target to select using element 174. For example, the user could enter a store name in element 174 and the application would generate a target list 172 of stores with that name (or with a similar name) in close proximity to the current location of mobile device 10. As another example, the user could enter a type of store (such as grocery, restaurant, or coffee) in element 174 and the application would generate a target list 172 of stores of that type (or similar type) in close proximity to the current location of mobile device. In certain embodiments, target list 172 may be sorted based on proximity, user history, popularity, and/or any other appropriate criteria. In these embodiments, the user may select a target from target list 172. In certain embodiments, the application may utilize information stored in memory 13 and/or may send queries and receive information through network interface 15 to generate target list 172.

In a particular embodiment, mobile application may initially present a target list based on geographic proximity and then provide user selection options to narrow the search criteria. In this embodiment, one of the user selection options may be to scan or photograph a visual element such as a mobile tag to select a target. In alternative embodiments, a user may narrow the target list by typing or otherwise identifying a target by name, category, or subject matter.

Figure 8:
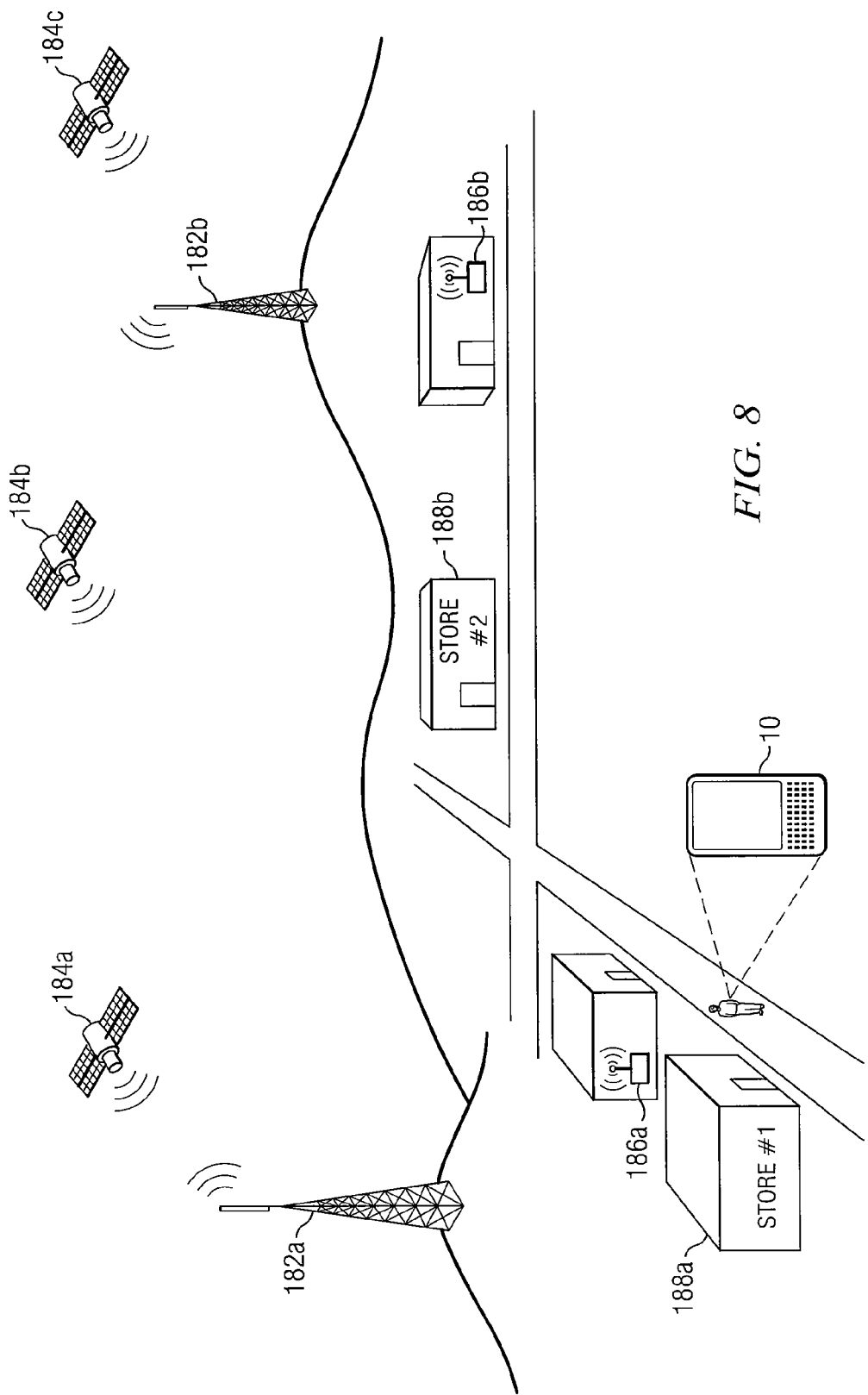
FIG. 8 illustrates components that may be used to determine the location of a mobile device.

FIG. 8 illustrates components that may be used according to various techniques to determine the location of mobile device 10. As discussed above, mobile device 10 may include a GPS chipset and an application on mobile device 10 may use the GPS chipset to determine the location of mobile device 10. In such embodiments, the GPS chipset would receive signals from a plurality of satellites 184 and use the information included in those signals to determine the location (e.g. latitude and longitude) of mobile device 10. In certain embodiments, mobile device may receive information through network interface 15 to increase the accuracy and or speed with which the GPS chipset determines the location of mobile device 10. For example, mobile device 10 may receive AGPS data transmitted to mobile device 10 by a cellular antenna 182.

In certain embodiments, in addition to or as an alternative to using a GPS chipset, locator 17 may determine the location of mobile device 10 through the use of triangulation relative to cell towers 182 and/or WiFi access points 186. In certain embodiments, this triangulation may use information stored in memory 13 and/or received through network interface 15. In certain embodiments, locator 17 may determine the location of mobile device 10 by evaluating the signal strength of one or more cell towers and/or WiFi access points. In certain embodiments, locator 17 may determine an approximate location and also determine a probability or error band associated with that location. In certain embodiments, the location of mobile device 10 may be determined by one or more components in communication with mobile device 10 through network interface 15. For example, one or more components of a cellular network may determine the location of mobile device 10 and communicate the determined location information to mobile device 10 and/or other components of system 100.

Once a particular target has been identified, the mobile interaction application may display a graphical user interface generated by mobile interaction application or received via network interface 15. FIGS. 9A-9C illustrate example graphical user interfaces 190 that may be used with a mobile interaction application. As shown in FIG. 9A, graphical user interface 190 may facilitate the collection of user feedback through the presentation of one or more feedback elements, including but not limited to a multi-level rating scale 191 and an open-ended comment element 192. In this particular embodiment, a user may provide an overall rating for the interaction target by selecting an appropriate rating from multilevel rating scale 191 and the user may provide open ended comments using input device 16 to type or otherwise insert text into open-ended comment field 192. A user may submit the provided feedback by selecting element 193b.

FIG. 9B illustrates an example graphical user interface 190 that may facilitate the collection of user feedback through the presentation of multi-level rating scale 191, open-ended comment element 192, and email provision element 194. Using email provision element 194, a user may provide an email address to which a response to the user's comments or other feedback may be sent.

FIG. 9C illustrates an example graphical user interface 190 that may facilitate the collection of user feedback through the presentation of multi-level rating scale 191, email selection element 196, and comment selection element 197. In this particular embodiment, a user may provide a response to an example explicit question 195 by selecting an appropriate rating from multilevel rating scale 191. In certain embodiments, a user may provide a response to an explicit question 195 using an open-ended comment field, selecting a choice from a drop-down menu, or any other appropriate feedback technique. Through the use of email selection element 196, an email application may be launched on mobile device 10, with the address field pre-populated for user feedback. In certain embodiments, a user may use comment selection element 197 to select the input technique that the user would like to use to provide open-ended comments. In the embodiments shown, the user may select "Text" to launch an open-ended text field to type or otherwise enter textual feedback; or the user may select "Talk" to launch a voice recorder allowing the user to leave an audio feedback message. In a particular embodiment, voice recognition logic may be utilized to convert an audio message to a text message. In certain embodiments, the voice recognition logic may be loaded on or accessible by mobile device 10 and may allow a user to see text that has been converted from an audio message. In certain embodiments, a photo or video clip may be included with the feedback submitted with by the mobile interaction application. For example, if a user comments that the overall opinion of a restaurant is poor and comments that the restaurant was not clean, the user could also attach a picture of the restaurant showing a specific example of the cleanliness problem.

In certain embodiments, graphical user interface 190 may include multiple multi-level rating scales 191 to facilitate the collection of user feedback for multiple categories. For example, in a particular embodiment, graphical user interface 190 may include separate multi-level rating scales 191 with one each for customer service, facility appearance, product quality, and a user's overall opinion. In certain embodiments the content and appearance of graphical user interface 190 (and/or other interfaces) may be customized for a particular target (such as a particular company, store, or product), user, or group of users. For example, different stores owned or franchised by the same company may have the same or different associated interfaces. As another example, a particular user may have an interface customized by or for the particular user. As another example, a group of users may be members of a particular group or club and the interface may be customized for the members of that group or club. In certain embodiments, multiple interfaces may be generated for a particular company and randomly or selectively implemented for different users or groups of users. In a particular embodiment, a company or brand may sponsor mobile application and use one or more of a variety of solicitations to solicit feedback for the company or brand. For example, the company may display plaques in their stores that promote the use of the mobile interaction application and also include a mobile interaction solicitation targeted for the particular company, brand, and/or store.

In certain embodiments, in addition to the user feedback provided through the use of graphical user interface 190, additional contextual data may be collected or associated with the user feedback. For example, a user may have a global or session specific option to also provide their location information, a personal identifier (as opposed to anonymous feedback), group information (such as frequent flyer number, or frequent shopper account), demographic information (such as age, gender, occupation, or family status), or previous feedback history. For example, a user may have the option to have all feedback submitted anonymously or alternatively to submit certain feedback anonymously and have other feedback submitted with personally identifiable information. In certain embodiments, the mobile interaction application may automatically include or associate contextual information with a user's feedback. Examples of such contextual information may additionally include: (1) for a restaurant, the store number, the server's name, the meal ordered, the time of day, and/or the location of the user in the restaurant; (2) for an airline flight, the flight number, the seat number, the attendant's name, and/or the pilot's name; and/or (3) for a magazine advertisement, the title and issue of the magazine in which the advertisement appeared and/or the version of the advertisement. In certain embodiments, some or all of this information may be encoded into graphical element 150. Additional or alternative contextual information may include the brand and model of mobile device 10, the user's wireless service provider, and/or the application version.

In certain embodiments, although portions of graphical user interface 190 may be designed or intended to collect specific types of user feedback, additional types of feedback may also be collected. For example, graphical user interface 190 may be designed or intended to collect feedback related to a particular store, but may be used to provide feedback unrelated to the particular store, such as feedback on a particular product or advertising campaign. As another example, graphical user interface 190 may be designed or intended to collect feedback related to a particular product or service, but may be used by mobile device users to provide feedback related to general corporate operations or recent news about the business.

In certain embodiments, user feedback may be categorized by the user that provides the feedback through the use of one or more tools available at the time the feedback is provided. For example, while a user is viewing element graphical user interface 190, the user may identify a category for a particular user comment, using a topic selection element. As an alternative, all or a portion of the user comments may be automatically categorized by one or more software applications executed on a computer system, in response to the user comments being accessed. For example, a software application executed on a computer system may utilize keyword associations to categorize user comments. In addition, or as an alternative, a software application executed on a computer system may utilize inductive learning algorithms, including Bayesian filters, or other appropriate logic to categorize user comments. In certain embodiments, a software application executed on a computer may utilize natural language interpretation techniques.

In certain embodiments, user comments may be categorized at least in part based on the user's demographic information, contextual information, or other information relating to the user or the user's methods of providing feedback. For example, user comments may be categorized based on the user's location and/or any combination of contextual information collected or associated with the user or the feedback. In certain embodiments, this categorization based on demographic information or contextual information may be used as an alternative to, or in addition to, categorization based on the user's comments or other feedback.

At the time that feedback is provided by a user through the use of a mobile interaction application, such feedback may provide a strong indication of whether the user is having a positive, neutral, or negative experience. By processing this feedback in real-time, alone or in combination with other information, actions can be taken to improve or enhance that particular user's experience at or near that particular point in time. In situations where the particular user is having a negative experience, such real-time intervention may be necessary to retain the user as a customer. In some situations, the few seconds after a user submits feedback may be the only opportunity to improve the user's experience before they leave the store, never to return. Accordingly, the ability to take action in this few seconds may be critical to retain a user's business. Although not required, in certain embodiments, in order to take action to intervene with a particular user's experience, characteristics of the user's experience must be determined, triggering or threshold requirements must be met, and appropriate interventions must be identified and delivered to the particular user before the user leaves their current location.

In certain embodiments, feedback or comments collected through the use of a mobile interaction application may be combined or used together with feedback or comments collected through other techniques. Examples of other techniques include collecting feedback through the use of a feedback mechanism associated with a particular website, web page, or Internet distributed advertisement, collecting feedback through comment cards distributed at a point of sale or other location, and collecting feedback through polls, surveys, or other random or selective data collection techniques.

Comments, feedback, and other data collected through these various techniques may be evaluated and used determine an appropriate response or intervention. Various embodiments may use a variety of triggers or threshold criteria to determine when an intervention or response should be initiated. For example, an intervention may be initiated automatically upon receipt of negative feedback. As another example, an intervention may be initiated once a user has provided feedback a certain number of times. In a particular embodiment, an intervention may be triggered in response to an analysis of the words and phrases used in an open-ended comment or audio comment provided in feedback by the user. In various embodiments, this analysis may be performed through the use of Boolean queries, through the application of Bayesian filters, or through the use of alternative automated inductive learning algorithms or other forms of artificial intelligence.

For example, based on an analysis of a plurality of user generated comments associated with corresponding multi-level ratings, a series of filters may be developed to identify particular words and phrases that, in combination, indicate a positive or negative user experience. These types of filters may be expanded to further consider additional information such as user demographics and contextual data. In certain embodiments, natural language interpretation techniques may be used to analyze particular blocks of text to evaluate the content. In certain embodiments, the threshold or trigger criteria may vary over time or from one user to the next according to specified criteria. For example, the threshold level may increase or decrease to some extent based on randomization logic such that the intervention experience is not identical from one user to the next. Through the use of such variation, additional information may be determined regarding the appropriate trigger levels and/or the appropriate interventions to achieve optimal results.

In certain embodiments, once a triggering threshold has been met and a determination has been made to initiate an intervention, the appropriate intervention may be identified and presented to the particular user. Although in certain embodiments, a single intervention may apply to all users who satisfy the specified triggering threshold, in alternative embodiments, a variety of interventions may be available. For example, different interventions may be associated with different stores, different interventions may be associated with different types of feedback, different interventions may be associated with different user demographics, etc. In a particular embodiment, comment feedback key-word associations may be used alone or in combination with contextual data to specify a particular intervention. For example, if a negative feedback is identified and the feedback includes a comment that contains the word "service," then an intervention may be identified that provides a coupon to discount the price the user pays for this or future purchases. Such real-time intervention may enhance the particular user's experience, which may result in continued or increased business by the user.

In a particular embodiment, an intervention may be in the form of a trouble ticket form that can be pre-populated with information collected regarding the particular user's experience. For example, in response to determining that a particular user has reported a problem related to a particular product or service in an open-ended comment box in a feedback form, a trouble ticket form may be generated that identifies the user's location, the product or service discussed, the text of the problem reported, and/or any other relevant information collected. Such a trouble ticket may be available for the particular user to review and send without having to re-type any of the information previously provided or to type information pre-populated in the trouble ticket form. Such intelligent support may encourage the user to submit the trouble ticket, allowing for a proper response and the possibility of continued use of the product or service by the user. In certain embodiments, such intelligent support may prevent the provision of the feedback by the user from being the last interaction that the user has with the product or service, or with the associated entity. In another particular embodiment, an intervention may be in the form of a seat upgrade or a frequent flyer miles bonus.

Figure 10:
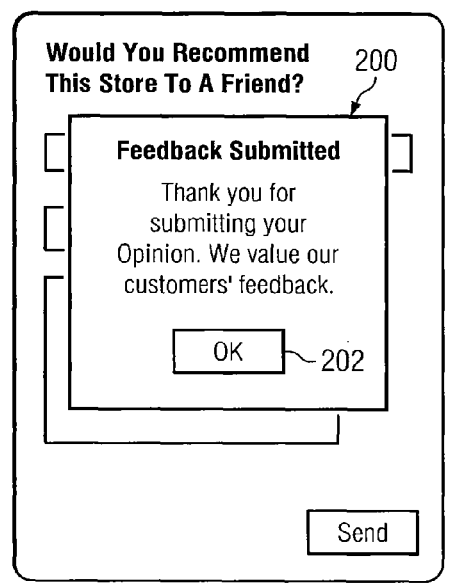
FIG. 10 illustrates an example response generated after a user provides feedback.

In certain embodiments, after a user has provided feedback, a response message may be generated. FIG. 10 illustrates an example response generated after a user provides feedback. The example response shown is in the form of a viewable element illustrated acknowledgement 200. In certain embodiments, acknowledgement 200 may be presented in a separate screen from graphical user interface 190 or may be superimposed over graphical user interface 190 in the same screen. In certain embodiments, acknowledgement 200 may include a cordial response to the user, an acknowledgment that the user has provided feedback, and/or any other appropriate message for the particular user who provided the feedback.

Figure 11:
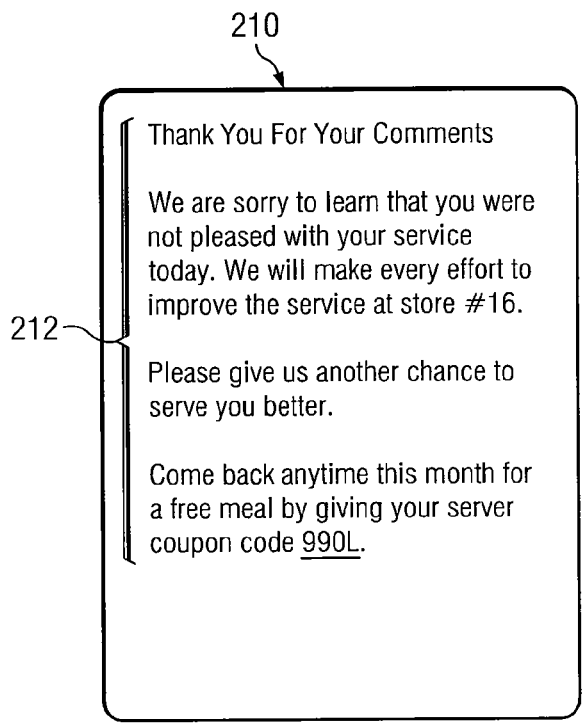
FIGS. 11-12 illustrate example interventions.

In certain embodiments, as an alternative to or in addition to acknowledgement 200, mobile interaction application may generate an intervention or response based on the particular user's feedback, contextual information, and/or other collected information. FIG. 11 illustrates an example intervention 210. In the example shown in FIG. 11, intervention 210 includes a customized message 212 intended to address one or more issues related to the user experience for the particular user. For example, if the particular user's feedback indicated that the user was dissatisfied with the service at store at store #16, this customized message would provide the particular user with an incentive to try the store again in the future. Specifically, this example customized response would include a coupon or coupon code for a free or discounted product or service. Intervention 210 may be generated in real-time or substantially real-time in response to the feedback or comments from the particular user. In certain embodiments, intervention 210 may be generated before the particular user leaves their current location.

Figure 12:
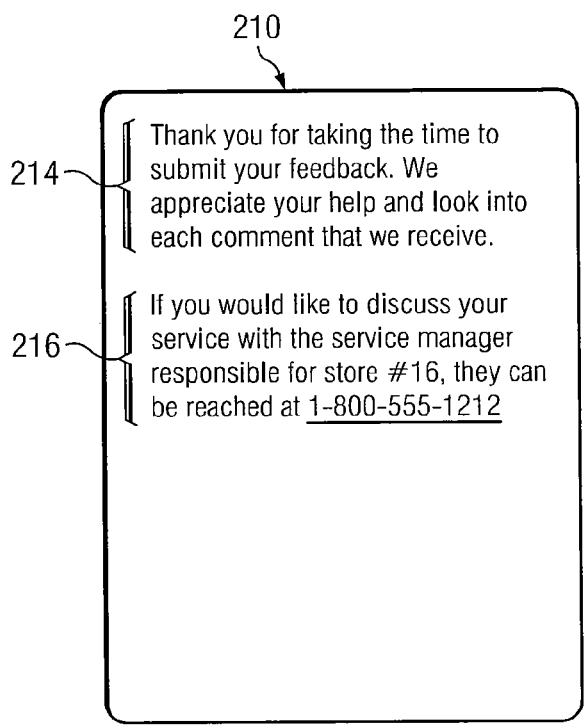

FIG. 12 illustrates another example intervention 210. In the embodiment shown, intervention 210 includes a generic response message 214 and a specific response message 216, selected based on the information received from or about the particular user. In this embodiment, rather than providing a coupon or coupon code, intervention 210 provides a phone number that the user may call to contact a service manager. In certain embodiments, the phone number shown may also serve as a link that will enable the user to directly dial the phone number to contact the customer service representative. In alternative embodiments, an appropriate intervention may take the form of an asynchronous messaging window that may allow the user to communicate asynchronously via text messages with a help desk or other form of customer service center. For example, a live chat window may be generated that allows the user to communicate with a particular customer service representative who can assist with a particular issue the user may have. In another embodiment, an intervention may take the form of an audio or video clip that may provide additional information intended to address the user's particular experience. In another embodiment, an intervention may take the form of a direct live audio or video communication, such as a live video conference with one or more individuals who may be able to address the user's particular experience. In certain embodiments, an intervention may offer the user a choice of one or more alternatives that the user may select depending on their particular preferences. In certain embodiments, customized interventions may be generated to address specific aspects of a user's feedback or tailored to a specific user or group of users.

Figure 13:
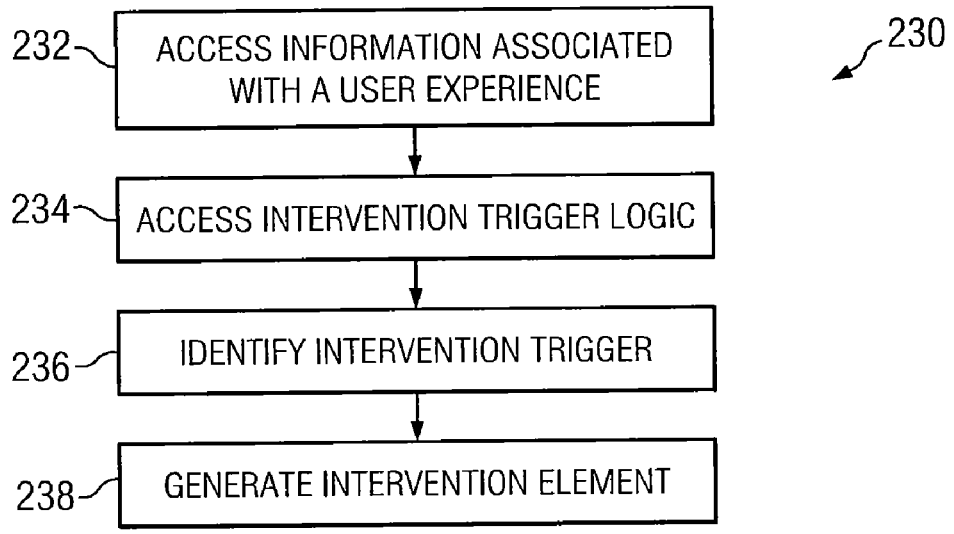
FIGS. 13-14 illustrate example methods for providing support and leveraging user experiences.

FIG. 13 is a flow chart illustrating an example method 230 for providing intelligent support. At step 232, information associated with a user experience is accessed. The accessed information may include various types of information, such as user feedback, historical data, contextual data, and/or user demographic information. At step 234, intervention trigger logic is accessed. In certain embodiments, such intervention trigger logic may be stored in a database. In certain embodiments, the intervention trigger logic may be developed through the use of a tool that may be used to associate certain triggering criteria with a particular intervention element. At step 236, an intervention trigger is identified. In certain embodiments, an intervention trigger may be identified by applying the intervention trigger logic to at least a portion of the accessed information. At step 238, an intervention element is generated. In certain embodiments, one or more intervention elements may be generated for presentation to the particular user, in response to the identification of at least one intervention trigger, to improve the user experience for the particular user.

Information about a particular user's experience, including user comments, feedback, and other types of information may be leveraged to obtain additional value for or from the particular user. For example, at the time that feedback is provided by a user through the use of a mobile interaction application or other feedback mechanism, such feedback may provide a strong indication of whether the user is having a positive, neutral, or negative experience. By processing this feedback in real-time, alone or in combination with other information, actions can be taken to leverage that particular user's experience at or near that particular point in time and/or particular location. For example, in situations where the particular user is having a positive experience, real-time actions may effectively leverage this positive experience for the benefit of the user, store, airline, company, third-party, etc. For example, if a user provides positive feedback about a product or service and the feedback can be analyzed in real-time (or substantially real-time), then action may be taken to introduce the user to similar or complimentary products or services. As another example, if a user provides feedback indicating that they currently own or use an older product or service, action may be taken to introduce the user to a newer product or service. In a particular embodiment, if it is determined that a particular user is using an older model product, a coupon or advertisement may be generated and/or presented to the particular user to encourage them to upgrade to a newer model product. As yet another example, if collected information indicates that the particular user is a frequent user of particular products or services, then action can be taken to provide additional benefits for that user as a reward for their frequent use. In a particular embodiment, as an example, if a user provides feedback about a flight and it is determined that the user is a member of a frequent flyer program, a message may be displayed to the particular user indicating that reduced rates or other advantages may be available to the user if they call in to a preferred customer service phone number or follow a link to a preferred pricing web page.

In some situations, the few seconds after a user's feedback or other information is collected may be the best opportunity to leverage the user's experience, because the information may directly indicate the types of things that the particular user is currently or very recently thinking about and may indicate whether the user has a positive or negative view of those same things. For example, if a user provides feedback indicating that they are very pleased with a particular product, the few seconds after they provide this feedback may be an ideal time to inform them of other products that are complimentary to the product that they are currently pleased with. This opportunity may vanish after the user leaves the store or after the user has begun considering other topics. Accordingly, the ability to take action in this few seconds may be critical to leverage the experience of a particular user. Appropriate actions may include any of the techniques described herein for interventions and may also include advertisements, coupons, or other marketing and cross-selling techniques. Although not required, in certain embodiments, in order to take action to leverage a particular user's experience, characteristics of the user's experience must be determined, triggering or threshold requirements must be met, and appropriate action must be identified and initiated before the user leaves a particular location.

Figure 14:
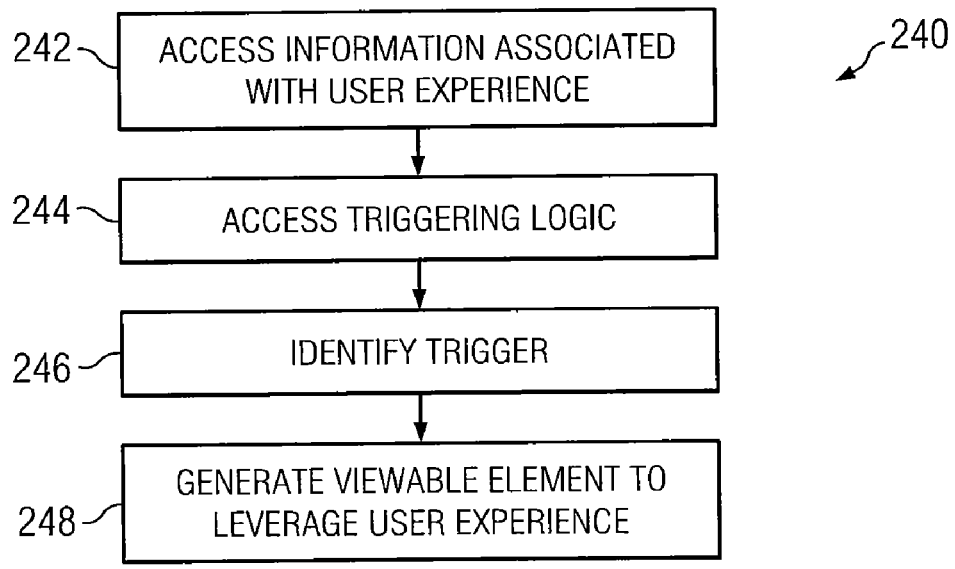

FIG. 14 illustrates an example method 240 for leveraging a user experience. At step 242, information associated with a user experience is accessed. The accessed information may include various types of information, such as user feedback, historical data, contextual data, and/or user demographic information. At step 244, triggering logic is accessed. In certain embodiments, such triggering logic may be stored in a database. In certain embodiments, the triggering logic may be developed through the use of a tool that may be used to associate certain triggering criteria with actions to leverage a user experience. At step 246, a trigger is identified. In certain embodiments, the trigger may be identified by applying the triggering logic to at least a portion of the accessed information. At step 248, a viewable element is generated to leverage a user experience.

Although example methods are described, the steps may be accomplished in any appropriate order and the present invention contemplates using methods with additional steps, fewer steps, or different steps, so long as the methods remain appropriate for providing intelligent support or leveraging a user experience. For example, certain embodiments may include presenting a generated intervention or viewable element to a particular user. As another example, certain embodiments may include collecting information regarding the particular user's response to at least one of the one or more viewable or intervention elements. For example, certain embodiments may detect whether a user clicked a link provided, viewed a video clip provided, listened to an audio clip provided, called a telephone number provided, purchased an advertised product, applied a coupon, or utilized an asynchronous messaging application, such as a live chat window. Certain types of interventions may include additional feedback collection features that the user may use to provide feedback on the user. For example, if the user was provided with information or directed to a source of information, the user may provide feedback that the information was helpful or not helpful. Certain embodiments utilize such collected information to correlate user or customer retention with intervention utilization or to correlate actions taken to leverage the user's experience with benefits obtained by or for that user. For example, certain embodiments may determine what if any impact certain interventions or actions may have on the churn rate of particular users, categories of users, or users in general.

Feedback from customers, partners, and the general public can be collected through the use of various tools and techniques. For example, feedback may be collected over the phone, such as through a call center or help desk. As another example, feedback may be collected in person, such as in focus groups or live marketing surveys. As another example, feedback may be written down and submitted through the mail or otherwise, such as in the case of a mail-in comment card. As another example, feedback may be collected electronically, such as through the use of a mobile device, computer, interactive television system, etc. In certain embodiments, feedback may be collected through the use of a mobile interaction application. In certain embodiments, feedback may be collected through the use of a feedback mechanism associated with a particular web site, web page, or Internet distributed advertisement. In certain embodiments, feedback may be collected through the use of a feedback mechanism associated with a particular television program, movie, or video advertisement. In the description provided, many example embodiments utilize electronically collected feedback, and more particularly feedback collected through a mobile interaction application, as an example; however, alternative embodiments of the present invention may utilize or operate with feedback collected using alternative tools and techniques, alone or in combination with feedback electronically collected through a mobile interaction application. The present invention is intended to encompass these alternative embodiments.

In certain embodiments, although a mobile interaction application may be designed or intended to collect specific types of user feedback, additional types of feedback may also be collected. For example, a mobile interaction application may be designed or intended to collect feedback related to a particular product, but may be used to provide feedback unrelated to the particular product, such as feedback on one or more customer service or facilities related issues. As another example, a mobile interaction application may be designed or intended to collect feedback related to a particular service, but may be used to provide feedback related to general corporate operations or recent news about the business. In embodiments of graphical user interface 190 that include an element for open-ended user feedback, the element may collect user feedback related to various aspects of a business and its operation. This user feedback may be broadly referred to as business intelligence. Such business intelligence may be related to any aspect of a business and its operation. For example, business intelligence may include e-commerce information, customer service, sales, facilities, environmental impact, products and services, marketing, corporate operations, etc.

In certain embodiments, user feedback related to business intelligence may be categorized by the user, software, or others. In certain embodiments, user comments may be categorized by associating each user comment with one or more categories selected from a predefined group of categories. For example, an analyst may view a comment, either printed on paper or displayed by a computer, and then using a computer system the analyst may submit information into a database to associate the user comment with one or more predefined business-related categories. In certain embodiments, user comments may be categorized at least in part based on the user's demographic information, contextual information, or other information relating to the user or the user's methods of providing feedback. For example, user comments may be categorized manually or automatically based on the user's mobile identification number, area code, location, username, password, service provider, mobile device type, mobile device brand, time zone, application version, and/or information on a SIM card. In certain embodiments, this manual or automatic categorization may be used as an alternative to, or in addition to, categorization based on the user's comments or other feedback.

Example business-related categories may include customer service, sales, facilities, environmental impact, product, marketing, corporate operations and categories related to e-commerce. In certain embodiments, one or more of these business-related categories may include one or more subcategories.

In certain embodiments, a subjective assessment of each user comment may be provided and ratings may be assigned to each user comment. In certain embodiments, user comments may be subjectively assessed by one or more analysts who may read user comments and then assign one or more ratings to each user comment. For example, an analyst may view a comment, either printed on paper or displayed by a computer; analyze the comment to provide a subjective assessment; and then using a computer system the analyst may submit information into a database to assign a rating to the user comment. As another alternative, all or a portion of the user comments may be automatically assessed by one or more software applications executed on a computer system. For example, a software application executed on a computer system may utilize keyword associations to assess user comments. In addition, or as an alternative, a software application executed on a computer system may utilize inductive learning algorithms, Bayesian filters, or other appropriate logic to rate user comments.

Example ratings may include positive, negative, and neutral ratings. Example ratings may range from positive integers to negative integers, with zero being a neutral rating (e.g., from −3 to +3). Example ratings may be only positive integers, with a specified integer being associated with a neutral rating, integers above that specified integer being associated with a positive rating, and integers below that specified integer being associated with a negative rating (e.g., from 1 to 5). Example ratings may be color-coded, with certain colors being associated with certain ratings. For example, green may be associated with positive ratings, red may be associated with negative ratings, and black or yellow may be associated with neutral ratings.

In certain embodiments, a report of user feedback may be generated. The report may include, for example, category indicators each identifying one of a plurality of business-related categories, and a plurality of quantitative indicators identifying, for each of the plurality of business-related categories, one or more quantitative values derived from collected user comments collected. For example, a quantitative indicator may identify the quantity of collected user comments associated with a particular business-related category. As another example, a quantitative indicator may identify the quantity of collected user comments assigned to a particular rating. As another example, a quantitative indicator may identify an average rating for multiple collected user comments associated with a particular business-related category. As another example, a quantitative indicator may identify a difference between a current average rating and a previous average rating. As another example, a quantitative indicator may identify a rate of change in the average rating for collected user comments associated with a particular category.

In certain embodiments, the report may be based on user feedback received within a specified period of time, such as user feedback received in the last day, week, month, quarter, etc. In certain embodiments, the report may be based on a certain number of user comments. For example, the report may indicate how many of the last one-thousand comments are associated with each business-related category.

In certain embodiments, a feedback report may be electronically generated and may be presented in an electronic format and displayed, for example, on a computer monitor or other form of electronic display. In a particular embodiment, the report may be updated in substantially real time, such that the information displayed in the report changes over time as additional user feedback is received. In these embodiments, the rate at which the report is updated may depend, among other things, upon the rate at which user feedback is categorized and assessed. In certain embodiments, a report may be used to provide an organized metric for assessing the health of a business and its operation across numerous business-related categories. In certain embodiments, a report may be used to provide a substantially real-time indication of customer, partner, and/or general public responses to one or more actions taken by a business. For example, a report may indicate customer responses to a new product introduced by a business. As another example, a report may indicate a general public response to actions taken by a business that have been discussed recently by one or more news media.

In certain embodiments, one or more software applications executed on a computer system may be utilized to generate a feedback report. In these embodiments, the one or more software applications executed on a computer system may further be utilized to generate automated alerts based on one or more criteria associated with the categorized user feedback. For example, if the quantity of user comments exceeds a certain limit within a specified period of time, an automated alert may be generated. In an alternative embodiment, if a certain number of user comments having a negative rating are received in a specified period of time, then an automated alert may be generated. Such an automated alert may include, for example, an email or a text message sent to a person within the business designated as having responsibility for a particular category. In certain embodiments, the target of an alert may be selected based on location, importance, function, or scope. For example, feedback about a particular store may be directed to the store's local manager for certain levels of feedback, to a regional manager for certain levels of feedback, and to a corporate manager for certain levels of feedback. In certain embodiments, alerts may be triggered based on the volume of feedback associated with a particular store, product, location, etc. In certain embodiments, feedback may be filtered to increase its reliability before triggering logic or other logic is applied. For example, if numerous comments are provided from the same location, mobile device, or user within a certain period of time, the comments may be filtered to avoid overweighting the opinion of a single user or group of users.

Several embodiments of the invention may include logic embodied in tangible media. For example, certain embodiments include software embodied in a tangible computer readable medium. Such logic may include computer software stored in a memory, executable on one or more processors, and operable when executed to perform one or more of the functions described herein. Example tangible media may include random access memory (RAM), read only memory (ROM), various types of optical or magnetic disk drives, flash memory, or removable storage media. For example, logic may be encoded on removable SIM, memory card, CD, DVD, flash drive, or tape media. In certain embodiments, the logic may be contained within a hardware configuration or a combination of software and hardware configurations. In certain embodiments, the logic may be stored in flash memory or another type of memory on a mobile device. The logic may also be embedded within any other suitable medium without departing from the scope of the invention.

Particular embodiments may be implemented as hardware, software, or a combination of hardware and software. As an example and not by way of limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Although the present invention has been described with several embodiments, a plenitude of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for collecting feedback from a mobile device user using a mobile interaction application executed on one or more processors of a mobile device, the method comprising:
   receiving a selection of a target of the feedback from the mobile device user;
   presenting a graphical user interface on a display of the mobile device, the graphical user interface comprising:
   a multi-level rating scale; and
   an open-ended comment element;
   receiving feedback associated with the selected target from the mobile device user through an input device of the mobile device, the received feedback corresponding to at least one of the multi-level rating scale and the open-ended comment element;
   wirelessly transmitting a message including the received feedback associated with the selected target and corresponding to at least one of the multi-level rating scale and the open-ended comment element;
   wirelessly receiving a message including one or more intervention elements; the one or more intervention elements based on the received feedback corresponding to at least one of the multi-level rating scale and the open-ended comment element; and
   graphically presenting the one or more intervention elements on the display of the mobile device.

2. The method of claim 1, wherein the selection of the target of the feedback comprises:
   determining a current location of the mobile device; and
   presenting one or more potential targets on the display of the mobile device, the potential targets identified based on proximity to the location of the mobile device; and
   wherein the selected target is selected from the one or more potential targets presented on the display of the mobile device.

3. The method of claim 1, wherein the selection of the target of the feedback comprises:
   receiving a digital image of a barcode acquired by a digital camera on the mobile device; and
   presenting one or more potential targets on the display of the mobile device, the potential targets identified based on an association with the barcode; and
   wherein the selected target is selected from the one or more potential targets presented on the display of the mobile device.

4. The method of claim 1, wherein the graphical user interface presented on the display of the mobile device is customized for the selected target of the feedback.

5. The method of claim 1, wherein the graphical user interface presented on the display of the mobile device comprises an explicit question concerning the selected target.

6. The method of claim 1, wherein the selection of a target of the feedback from the mobile device user is received through an input device on the mobile device, the input device being from the group consisting of a touchscreen, a keypad, a directional pad, and a trackball.

7. The method of claim 1, further comprising:
   receiving a confirmation message in response to the wirelessly transmitted message;
   graphically presenting the confirmation on the display of the mobile device.

8. The method of claim 1, wherein:
at least one intervention element is customized to address specific comments included in the wirelessly transmitted message.

9. Software for collecting feedback from a mobile device user, the software embodied in a tangible media and operable, when executed by one or more processors on a mobile device, to:
receive a selection of a target of the feedback from the mobile device user;
present a graphical user interface on a display of the mobile device, the graphical user interface comprising:
a multi-level rating scale; and
an open-ended comment element;
receive feedback associated with the selected target from the mobile device user through an input device of the mobile device, the received feedback corresponding to at least one of the multi-level rating scale and the open-ended comment element;
wirelessly transmit a message including the received feedback associated with the selected target and corresponding to at least one of the multi-level rating scale and the open-ended comment element;
wirelessly receive a message including one or more intervention elements; the one or more intervention elements based on the received feedback corresponding to at least one of the multi-level rating scale and the open-ended comment element; and
graphically present the one or more intervention elements on the display of the mobile device.

10. The software of claim 9, further operable to:
determine a current location of the mobile device; and
present one or more potential targets on the display of the mobile device, the potential targets identified based on proximity to the location of the mobile device; and
wherein the selected target is selected from the one or more potential targets presented on the display of the mobile device.

11. The software of claim 9, further operable to:
receive a digital image of a barcode acquired by a digital camera on the mobile device; and
present one or more potential targets on the display of the mobile device, the potential targets identified based on an association with the barcode; and
wherein the selected target is selected from the one or more potential targets presented on the display of the mobile device.

12. The software of claim 9, wherein the graphical user interface presented on the display of the mobile device is customized for the selected target of the feedback.

13. The software of claim 9, wherein the graphical user interface presented on the display of the mobile device comprises an explicit question concerning the selected target.

14. The software of claim 9, wherein the selection of a target of the feedback from the mobile device user is received through an input device on the mobile device, the input device being from the group consisting of a touchscreen, a keypad, a directional pad, and a trackball.

15. The software of claim 9, further operable to:
receive a confirmation message in response to the wirelessly transmitted message;
graphically present the confirmation on the display of the mobile device.

16. The software of claim 9, wherein:
at least one intervention element is customized to address specific comments included in the wirelessly transmitted message.

17. A mobile apparatus for use in collecting feedback for a selected target, the mobile apparatus comprising:
a wireless transceiver;
a digital display;
a digital camera;
one or more processors coupled to the transceiver, the digital display, and the digital camera; and
memory coupled to the one or more processors, the memory storing program instructions configured, when executed by the one or more processors, to:
receive data from the digital camera, the data corresponding to a barcode image collected by the digital camera;
transmit an outgoing message using the wireless transceiver, the outgoing message containing data corresponding to at least a portion of the barcode image;
receive an incoming message using the wireless transceiver, the incoming message containing parameters for one or more feedback solicitation elements based on the data contained in the outgoing message, at least one of the one or more feedback solicitation elements comprising a multi-level rating scale;
using the parameters received in the incoming message, present the one or more feedback solicitation elements on the digital display;
receive feedback corresponding to the multi-level rating scale;
wirelessly transmit a message including the received feedback corresponding to the multi-level rating scale; and
wirelessly receive a message comprising one or more intervention elements based on the received feedback corresponding to the multi-level rating scale;
graphically present the one or more intervention elements on the digital display.

18. The mobile apparatus of claim 17, wherein the barcode image corresponds to a barcode of a type included in the group consisting of:
a one-dimensional barcode;
a two-dimensional square barcode;
a two-dimensional rectangular barcode; and
a two-dimensional round barcode.

19. The mobile apparatus of claim 17, wherein the barcode image corresponds to a color barcode.

20. A computer-implemented method for providing mobile interaction, comprising:
using a computer system, accessing information associated with a user experience for a particular mobile user and associated with a target entity, the accessed information including user feedback collected from the particular mobile user using mobile interaction software on a mobile device, the target entity having been selected based either on association with a location of the mobile device or on association with a graphical image collected by a camera on the mobile device, the user feedback including at least a selection, by the particular mobile user, of a choice from a multi-level rating scale;
using a computer system, accessing intervention trigger logic;
using a computer system, identifying at least one intervention trigger by applying the intervention trigger logic to at least a portion of the accessed information associated with the user experience, the intervention trigger being identified based on the selection, by the particular mobile user, of the choice from the multi-level rating scale; and using a computer system, generating one or more intervention elements for presentation to the particular mobile user, in response to the identification of at least one intervention trigger.

21. The method of claim 20, wherein the accessed information associated with a user experience for a particular mobile user includes contextual information regarding one or more aspects of the particular user's mobile device, the contextual information comprising at least one selected from the group consisting of a mobile device brand, a mobile device model, a software version, a network access provider, and a location of the mobile device.

22. The method of claim 20, wherein:
the user feedback further comprises at least one comment collected from the particular mobile user using feedback collection software; and
the intervention trigger logic is applied to at least a portion of the accessed information by analyzing the contents of the at least one comment collected from the particular mobile user.

23. The method of claim 20, further comprising, using a computer system, presenting at least one of the one or more intervention elements to the particular user, wherein the at least one of the one or more intervention elements comprises at least one selected from the group consisting of an asynchronous messaging application, a hypertext link to a web page, an audio element, and a video element.

24. The method of claim 20, further comprising, using a computer system, transmitting at least one of the one or more intervention elements to the mobile device of the particular user in substantially real-time after the user feedback has been collected from the particular user using feedback collection software.

25. The method of claim 24, further comprising, using a computer system, collecting information regarding the particular user's response to at least one of the one or more intervention elements.

* * * * *